Sept. 15, 1931.   N. A. CHRISTENSEN   1,823,590
CLUTCH OPERATING MECHANISM
Filed April 15, 1929
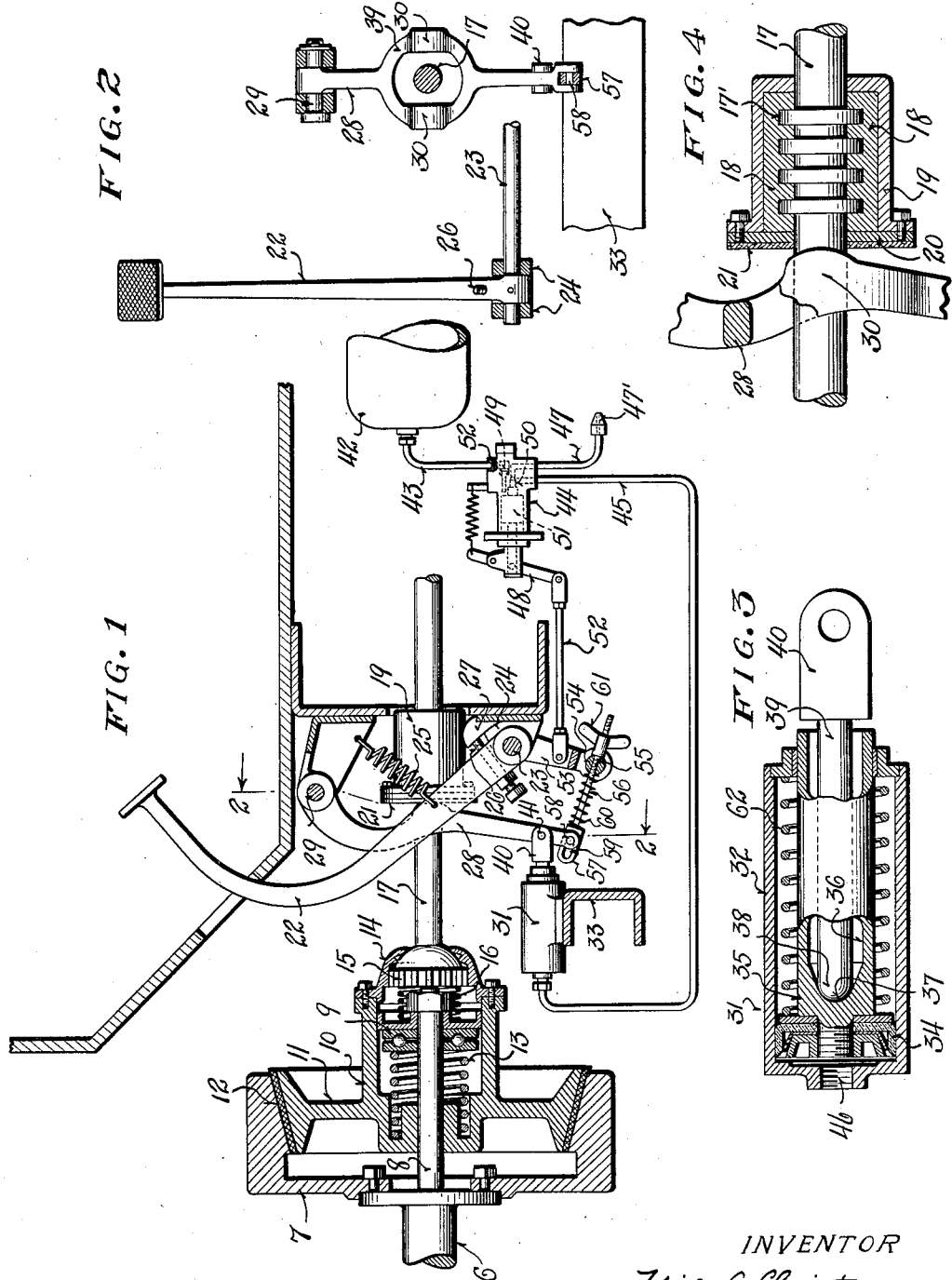
INVENTOR
Niels A. Christensen
by Marlor & French
ATTORNEYS Patented Sept. 15, 1931

1,823,590

UNITED STATES PATENT OFFICE

NIELS A. CHRISTENSEN, OF CLEVELAND, OHIO

CLUTCH-OPERATING MECHANISM

Application filed April 15, 1929. Serial No. 355,364.

The invention relates to clutch-operating mechanism for automotive vehicles.

In some automotive vehicles, particularly high-powered buses where the clutch has to transmit one hundred horse power or more, and even in smaller automotive apparatus, it requires almost as much exertion to operate the clutch as to operate the conventional foot brake. The object of this invention is to provide fluid-pressure operated mechanism for operating the clutch to relieve the operator of this heavy duty, but so associated with the foot pedal that the foot operation may be used if occasion arises or if it is necessary to augment the fluid-pressure.

The invention further consists in the several features hereinafter set forth and more particularly defined by claim at the conclusion hereof.

In the drawings Fig. 1 is a side elevation view of clutch-operating mechanism embodying the invention, parts of the clutch mechanism being shown in vertical section;

Fig. 2 is a detail sectional view taken along the line 2—2 of Fig. 1;

Fig. 3 is a detail vertical sectional view through the actuating cylinder;

Fig. 4 is a detail sectional view through the actuator lever and thrust collar.

While the mechanism hereinafter described may be associated with any clutch mechanism of the disk, plate or other suitable type, I have, for the purpose of illustration, shown it associated with the disk clutch construction embodied in the Marmon automobile of the year 1917, wherein the motor shaft 6 is connected to the fly-wheel 7 and has a shaft extension 8 carrying a thrust collar 9 mounted in the hub 10 of the clutch disk 11 which is normally held against the clutch face 12 of the fly-wheel by a spring 13 interposed between said hub and said collar. In this construction also the hub carries a connector 14 provided with internal gear teeth meshing with the teeth of a gear 15, which is formed spherical at its rear and is urged toward the right by a light spring 16 interposed between the gear 15 and the thrust collar, which spring is to prevent the shaft 17 associated with the gear from rattling. The shaft 17 has a suitable slidable driving connection (not shown) with the usual universal joint connecting it with a shaft associated with the rear axle drive. This construction provides for the release of the clutch on the longitudinal movement of said shaft 17 to the right and in order to brake the action of the clutch on releasing in the above mentioned construction, a thrust collar device is associated with the shaft 17. For this purpose the shaft 17 is provided with four annular projections 17' about which fits a two-part complementary shell 18 formed of suitable bearing material, the halves of said shell being enclosed with a case 19 having a removable end cover plate 20 which carries a pad 21 of fibre or other yielding material that is engaged by the clutch actuator to shift said shaft 17 and consequently the clutch disk 11 out of engagement with the fly-wheel, when desired, it being noted that the shell 18 and case 19 normally float on the shaft 17 but when pressed against by the clutch actuator are retarded and tend to retard the rotation of shaft 17 and thereby act as a brake.

According to the present invention an operator-actuated, pivoted clutch pedal 22 is connected at its lower end to a shaft 23 suitably journalled in brackets 24 associated with the vehicle frame, the pedal being normally moved to its upward position by a spring 25 and held in a proper adjusted position by the engagement of an adjustable screw-stop 26 on said pedal with a fixed stop 27.

A clutch-shifting lever 28 is pivotally mounted at one end on a shaft 29 supported in the vehicle frame and having a forked, intermediate portion 30 straddling the shaft 17 and engageable with the pad 21, its lower end being adapted to be moved either by power or manually, or both, through connections with a fluid-pressure-operated motor 31 and the pedal 22.

The fluid-pressure-operated motor comprises a cylinder 32 secured to one of the transverse frame members 33 of the vehicle and having a suitably packed piston 34 working therein and provided with a rod 35 having a bore 36 formed therein with a spherically conical inner end 37 against which the spherically conical end 38 of a thrust member 39 engages, said member 39 having a forked outer end 40 connected by a pivot pin 41 with the lower free end portion of the lever 28.

The piston of the motor cylinder may be operated through the force of any suitable fluid under the control of valve mechanism controlled by the foot pedal 22 and in the present instance I have shown a reservoir 42 containing compressed air connected by piping 43 with a control valve mechanism 44 which admits compressed air into the pipe 45 connecting the casing of the valve with the inlet 46 to the motor cylinder, or which permits the exhaust of air from said cylinder through the exhaust conduit 47. This control valve mechanism may be of any suitable construction embodying an inlet valve and an exhaust valve operable from a lever or other suitable actuator 48 and that shown is similar to the device shown and described in my prior United States Letters Patent No. 1,613,021, dated Jan. 4, 1927, to which reference may be had for a fuller showing thereof, it being noted that the inlet valve 49 is operated by a piston 50 associated with the actuator 48 and which piston carries the exhaust valve 51. In the present construction, however, the inlet opening 52 to the valve casing is restricted to prevent too sudden an actuation of the motor piston 34 and the exhaust pipe 47 has a restricted discharge nozzle 47' to provide for a gradual exhaust and hence a gradual movement of the motor piston 34 to release position and hence a gradual engagement of the clutch.

For actuating the control valve from the clutch pedal a link 52 operatively connects the lever 48 with a lever arm 53 mounted on the shaft 23 carrying the foot pedal 22 so that when said pedal is depressed the first movement acts to move the link 52 to the right, thereby moving the actuator 48 to act through the piston 50, as in the aforementioned patent, to close the exhaust valve 51 and open the inlet valve 49 to admit compressed air into the motor cylinder 32 which then acts to move the piston 34 and thrust member 39 to the right and thus swings the free end of the lever 28 to the right, which, engaging the thrust collar 21, moves the shaft 17 to the right to release the clutch and on a release of the clutch pedal the link 52 moves the lever 48 to release position, thereby causing the inlet valve 49 to close and the exhaust valve 50 to open and release the motor fluid in the motor cylinder and permit its piston, the lever 28 and shaft 17 to return to their initial position, in which event the clutch is again engaged.

In order to provide for manual operation of the clutch in case fluid pressure is not available or to augment the fluid pressure power, if necessary, a connection is provided between the pedal 22 and the lever 28. For this purpose the lever 53 is provided at its free end with a trunnion 54 which has a transverse opening 55 therein in which the threaded end of a rod 56 is loosely mounted. The rod 56 has a slotted, forked end 57 connected to the lever 28 by a pin 58 working in the slot 59 and normally held against the right hand end of said slot by a spring 60 interposed between said end 57 and said lever, the movement of said rod 56 being limited by an adjusting screw 61 mounted on the threaded end of said rod and engageable with said lever.

In addition to the holding of said rod 56 in the position above noted, the spring 60 acts against the lever 28 and hence parts 40 and 35 to return the piston 34 of the motor cylinder to release position, the spring 60, however, being weaker than the spring 25 so that the clutch pedal will be returned to its upper position when the other parts are in release position. However, instead of the spring 60 being relied upon to return the piston 34 to release position, a spring 62 may be placed in the cylinder 32 between its rear end and the piston 34 for this purpose.

When the operator presses down on the pedal 22 and operates the control valve 44 the lost motion connection afforded by the slot 59 allows said lever, including arm 53, to move for this purpose before the rod 56 can act on the lever 28 and as soon as the inlet valve 49 opens the motor acts as previously described to apply the necessary power to the lever 28 to throw out the clutch. In the event that the pressure fluid is not available, a continued movement by the operator on the pedal 22 takes up the lost motion between the rod 56 and the lever 28 and the clutch is then manually disengaged through the pull effected by the rod 56 on the lever 28, this action not being interfered with by the motor mechanism, since the thrust member 40 is free to move outwardly in the bore 36 relative to the piston rod 35.

I desire it to be understood that this invention is not to be limited to any particular form or arrangement of parts except insofar as such limitations are included in the claim.

What I claim as my invention is:

In an automotive vehicle, the combination with a pivoted clutch-shifting member, of a pivoted clutch pedal having a crank arm, a member connecting said crank arm and the free end of said clutch-shifting member together for manual operation of the latter and having a lost motion connection with said shifting member permitting independent movement of the latter, a fluid-pressure-operated motor having a releasable thrust member also connected to the free end of said shifting member, control valve mechanism for said motor, and an operating connection for said mechanism associated with said crank arm.

In testimony whereof, I affix my signature.

NIELS A. CHRISTENSEN.